US005491669A

United States Patent [19]
Chambers

[11] Patent Number: 5,491,669
[45] Date of Patent: Feb. 13, 1996

[54] METHOD FOR IDENTIFYING AND SUPPRESSING ANOMALOUS FREQUENCY COMPONENTS IN SEISMIC DATA

[75] Inventor: Ronald E. Chambers, Houston, Tex.

[73] Assignee: Western Atlas International, Houston, Tex.

[21] Appl. No.: 319,276

[22] Filed: Oct. 6, 1994

[51] Int. Cl.$^6$ ..................................................... G01V 1/36
[52] U.S. Cl. .................. 267/49; 367/32; 367/43; 367/73; 364/421
[58] Field of Search .................. 367/32, 43, 49, 367/73; 364/421, 422

[56] References Cited

U.S. PATENT DOCUMENTS

| | | | |
|---|---|---|---|
| 4,545,039 | 10/1985 | Savit | 367/39 |
| 4,866,679 | 9/1989 | Chambers | 367/47 |

OTHER PUBLICATIONS

Goyrilland et al, Geoexploration, vol. 23, #1, pp. 85–102, Oct. 1984.

Taner, M. T.; Koehler, F., "Surface Consistent Corrections", Geophysics, vol. 46, No. 1 (Jan. 1981), pp. 17–22.

Primary Examiner—Nelson Moskowitz
Attorney, Agent, or Firm—William A. Knox

[57] ABSTRACT

A method for spectral noise abatement from seismic data. The data are decomposed into organizational components from which a noise component can be resolved by well-known iterative methods. A statistic is calculated by comparing the measured spectral content of the data with a model spectrum. The seismic data are scaled in proportion to the ratio between the model spectrum and the measured spectrum, following which the processed signal traces are displayed as representative of a cross section of the earth.

6 Claims, 3 Drawing Sheets

METHOD FOR IDENTIFYING AND SUPPRESSING ANOMALOUS FREQUENCY COMPONENTS IN SEISMIC DATA

BACKGROUND OF THE INVENTION

1. Field of the Invention

Seismic data processing with particular emphasis on identifying and suppressing unwanted frequency components from seismic data based on the assumption that surface-consistent contributions can be identified in accordance with trace organization.

2. Discussion of Related Art

Although the art of seismic exploration is very well known, it will be briefly reviewed to provide definitions of technical terms to be referenced herein.

An acoustic source of any desired type such as, by way of example but not by way of limitation, a vibrator, an explosive charge, an air or gas gun, or an earth impactor, is triggered to propagate a wavefield radially from the source location. The wavefield insonifies subsurface earth formations whence it is reflected therefrom to return to the surface. The mechanical earth motions due to the reflected wavefield are detected as electrical signals by an array of seismic receivers or receiver groups distributed at preselected spaced-apart group intervals, at or near the surface of the earth, along a designated line of survey.

Hereafter for brevity, the term "receiver", unless otherwise qualified, means either a single seismic receiver or a relatively compact group of interconnected seismic receivers. The mechanical motions detected by the receivers are converted to electrical or optical signals which are transmitted over ethereal, electrical or optical data-transmission links to a multi-channel recording device. Usually, each receiver is coupled to a dedicated recording channel. An array may encompass many tens or hundreds of receivers which are coupled by a transmission link to a corresponding number of data-recording channels. To reduce the need for an excessive number of individual data transmission lines between the receivers and the recording channels, the receivers share a relatively few common transmission lines and the signals from each receiver are multiplexed into the appropriate data-recording channels by any convenient well-known means.

In operation, the selected source type successively occupies a plurality of source locations along the line of survey, emitting a wavefield at each location. After each emission, the source is advanced along the line by a multiple of the receiver spacing interval. At the same time, the receiver array is advanced along the line of survey by a corresponding spacing. In other arrangements such as for use with three-dimensional studies, the sources and receivers are emplaced at the intersections of a uniformly-spaced coordinate grid.

The distance between a source location $S_i$ and the nth receiver location $R_j$ is defined as the offset $O_l$. The reflected wavefield trajectory impinges on a subsurface formation at the midpoint $G_k$ between the source location $S_i$ and the receiver location $R_j$. As before stated, the electrical output from the nth receiver is recorded in the nth recording channel $C_n$.

In its trajectory through the earth, a propagating wavefield is influenced by instrumental characteristics of the source, the receivers and the recording channels. The wavefield is further influenced by the filtering effect of the earth materials through which it passes and by effects due to earth-source-receiver coupling. For purposes of this disclosure, those influences will be referred to collectively as organizational effects.

In addition to organizational effects, the wavefield may become contaminated by noise. By definition, any seismic signal that interferes with the clear reception of desired data from a target formation is noise. A perceived seismic wavefield may be described by an amplitude term and a spectral (frequency) term. Noise may take the form of random anomalous transients that distort the amplitude component, the spectral component or both.

It has been shown by Taner et al. (see Surface Consistent Corrections, *Geophysics*, v. 46, n. 1, January 1981, pp 17–21) as well as in U.S. Pat. No. 4,866,679, issued Sep. 12, 1989 to Ronald E. Chambers and assigned to the assignee of this invention and incorporated herein by reference, that unwanted amplitude-related noise can be isolated by decomposing seismic reflection-data measurements into organizational components of source, receiver, offset, common midpoint, and channel-consistent quantities as follows:

$$A_{ijh} = S_i * R_j * G_{hk} * O_l * C_n * N, \qquad (1)$$

where $A_{ijh}$ is the measured amplitude level of the signal at time window h of a wavefield received at receiver $R_n$ at location j, offset from a source S at location i by a distance l after reflection from subsurface midpoint $G_h$ at position k as recorded in channel $C_n$. N is the noise component.

Equation (1) can be linearized by taking the natural logarithm of both sides and adding, thus:

$$\ln A_{ijh} = \ln S_i + \ln R_j + \ln G_{hk} + \ln O_l + \ln C_n + \ln N. \qquad (2)$$

The energy and spectral contributions due to the respective components are derived from common source gathers, common receiver gathers, common midpoint gathers, common offset gathers as found from well-known conventional multifold coverage methods and as described and illustrated in the Taner reference above cited. Channel defects may be found by simple inspection of the data recordings derived from respective gathers.

Formulation (2) is arranged in a matrix which is inverted using, for example but not for limitation, an iterative Gauss-Seidel equation-solver routine to solve for the coefficients of the component terms and the noise component N as explained in the '679 patent. Re-combining (2) after removal of the noise component N yields a noise-free model trace $B_{ijh}$ for time window h.

Given a signal having an average measured amplitude level, $A_{ijh}$, for an individual trace within time window h, the level of the signal is conditionally scaled to become scaled signal $X_{ijh}$ as follows:

$$X_{ijh} = \begin{cases} (B_{ijh}/A_{ijh})^m, & A_{ijh} > B_{ijh} \\ \delta, & A_{ijh} \leq B_{ijh} \end{cases} \qquad (3)$$

where m is a user-defined integer equal to or greater than unity and $\delta$ is some threshold value such as 1.0.

The principles above discussed apply to noise abatement with respect to anomalous signal amplitude levels. Taner also applied the method to anomalous phase shifts due to near-surface irregularities. He did not, however, address himself to spectral interference as such nor did the '679 reference consider the spectral content of undesired transients.

Spurious monochromatic or limited-bandwidth polychromatic frequencies sometimes seriously contaminate seismic recordings. Sources may include 50- or 60-Hz power-line hum, periodic pulsations from water pumps or pipe-line booster pumps, ship-generated propeller noises, sea-creature conversations and water bottom multiples. The interfering spectral noises overlap the seismic signal spectrum and wreak havoc with the desired signals, particularly the very weak relatively low-frequency signals reflected from layers deep within the earth. In some cases, unwanted signals are minimized by spatial or instrumental filtering. Sometimes the undesired spectral components can be removed by bandpass filtering. But often the spectral noise overwhelms the known treatments.

There is a need for a processing method for discriminating against residual anomalous frequency spectra. The method mst be efficient and economical of processing time.

SUMMARY OF THE INVENTION

A method for abating spectral noise contamination from seismic data requires the acquisition of a block of time-scaled seismic traces. The traces are partitioned into time windows of desired length and the spectral components are resolved by octaves within each time window. A preselected model spectrum is provided. A raw statistic of any preferred type is calculated from the difference between the spectrum as measured from the seismic data and the model spectrum. For each time window and each octave, the statistic is decomposed into organizational components from which the noise component may be derived. The organizational components are then recombined after removal of the noise component therefrom. For each trace of the data block, the raw statistic is compared with the recombined, noise-free statistic. When the raw statistic exceeds the recombined, noise free statistic for a particular trace, that trace is scaled in proportion to the ratio between the recombined statistic and the raw statistic.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
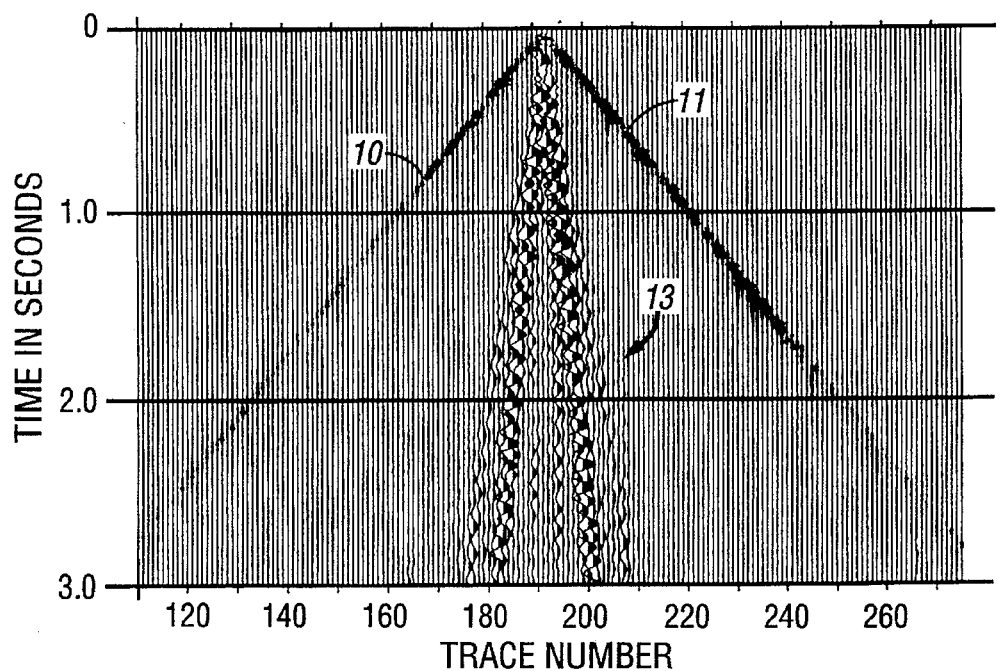
FIG. 1 is an example of spectral interference.

FIG. 1 illustrates a seismic section that exhibits severe spectral contamination due to strong monochromatic 70-Hz water arrivals 10 and 11 ahead of the reflection data 13. As is customary, the vertical axis is two-way reflection travel time and the horizontal axis represents the spatial separation between the respective seismic receivers which, in this case is 50 meters, one receiver station per trace. The unwanted interference occurs within a time window between 0.100 and 2.800 seconds and stretches spatially out to about 4000 meters.

The method begins by partitioning the respective seismic traces into a plurality of overlapping time windows of a desired length such as 0.200 second. The spectral content for each trace and each time window is measured as derived from the power spectrum as calculated by any well-known method. The resulting power spectrum is resolved by octaves into a set of q frequency components or spectral samples $X_q$ as shown by the dashed curve 12 in FIG. 2. An octave is defined as the interval between two frequencies having a ratio of 2 (or ½). A user-supplied model spectrum 14 is provided (solid lines, FIG. 2) which includes the anticipated spectral components for real data as determined, for example, from experience in the area under survey.

Figure 2:
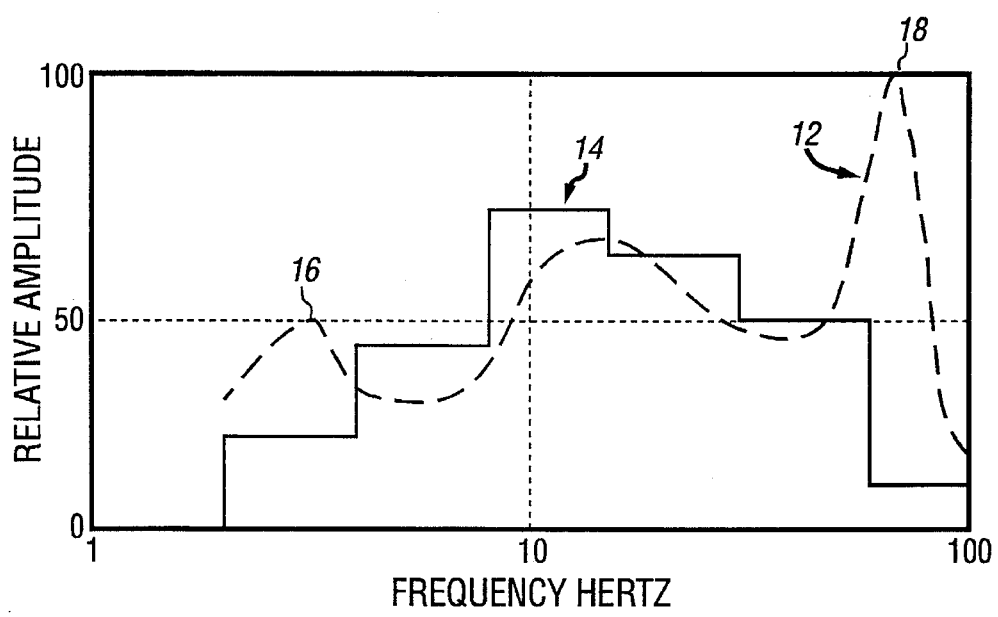
FIG. 2 is a comparison of a model spectrum as compared to the power spectrum measured from real data.

In FIG. 2, the spectrum from 1 to 100 Hertz has been divided into octaves and the expected spectral content for each octave is shown by the horizontal line segments such as 14. The measured power spectrum for a seismic trace selected from FIG. 1 is shown by the dashed curve 12. Low-frequency 3-Hz noise is suggested at 16 and the 70-Hz interference due to the water arrivals peaks at 18.

A desired statistic such as $X^2$ is computed from the summed difference between the measured spectral samples $X_q$ and the corresponding model spectral samples $M_p$ divided by the sum of the model spectral samples:

$$\chi^2 = \frac{\Sigma(X_q - M_p)^2}{\Sigma M_p} \quad (4)$$

where $X^2$ = raw frequency statistic, $M_p$ = model frequency statistic.

The statistic $X^2$ is decomposed into organizational components and the noise components in a manner analogous to equations (2) and (3) as explained earlier except that the $X^2$ components of the seismic trace are substituted for the amplitude components $A_{ijh}$. Solving for and recombining the organizational components produces a noise free statistic.

For each trace and time window, the raw, measured statistic is compared with the noise-free recombined statistic. If the raw statistic exceeds the recombined statistic, the seismic trace is scaled in proportion to the ratio between the recombined statistic and the raw statistic. Otherwise the scaling coefficient is equal to unity as shown below:

$$K = \begin{vmatrix} (\chi_q^2/\chi_p^2)^n, & \chi_q^2 > \chi_p^2 \\ 1.0, & \chi_q^2 \leq \chi_p^2 \end{vmatrix} \quad (5)$$

where

K = scaling constant, $X_q^2$ = raw statistic, $X_p^2$ = recombined statistic, n = damping factor, an integer equal to or greater than unity.

In an alternate embodiment of this invention, the individual frequency-range components are decomposed into organizational components and the noise component in a manner analogous to equations (2) and (3) as explained earlier, except that the frequency range components of the seismic trace are substituted for the amplitude components $A_{ijh}$. Solving for and recombining the organizational components provides a noise-free set of frequency-range information.

For each trace and time window, the raw, measured frequency-range component is compared with the noise-free combined frequency-range component. If the raw statistic exceeds the combined statistic, the seismic trace is scaled in proportion to the ratio between the recombined statistic and the raw statistic. Otherwise the scaling coefficient is set equal to unity as shown by $$K = \begin{vmatrix} (X_p/X_q)^n, X_q > X_p \\ 1.0\ X_q \leq X_p \end{vmatrix} \quad (6)$$

where

K= scaling coefficient, $X_q$= raw statistic, $X_p$= recombined statistic, n= damping factor, an integer equal to or greater than unity.

Figure 3:
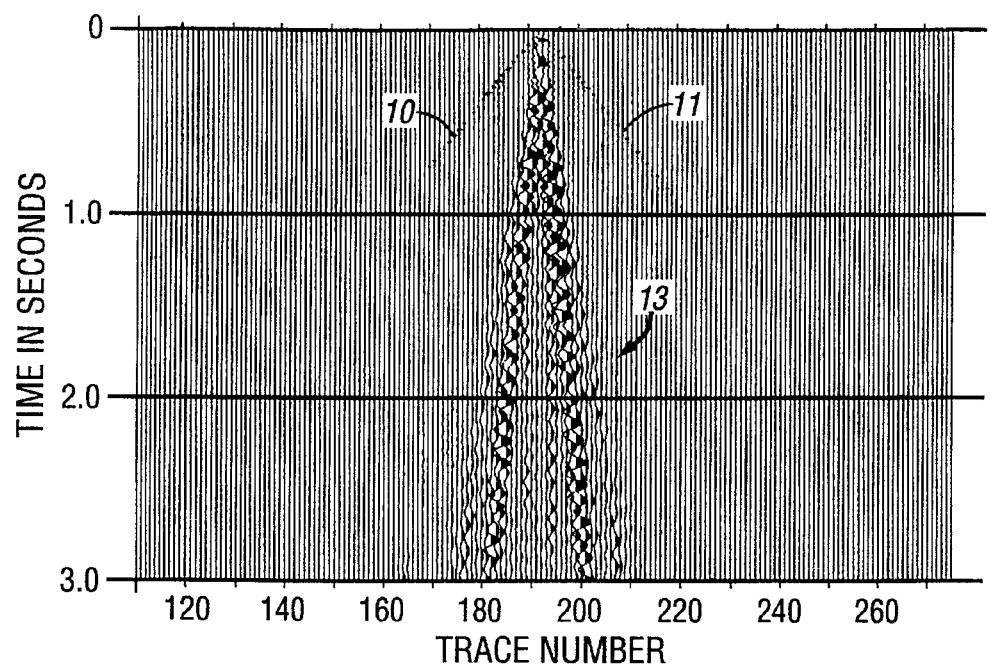
FIG. 3 is the example of FIG. 1 after application of the principles of the first embodiment of this invention wherein a damping factor value, n, of unity is used.
Figure 4:
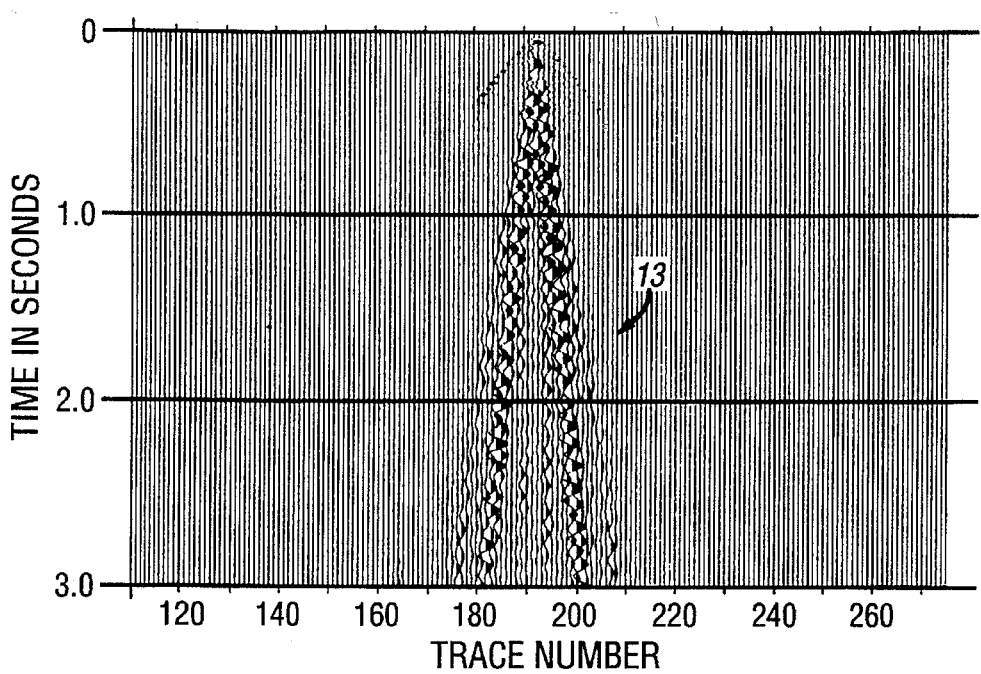
FIG. 4 is the same example wherein a very large value for the damping factor, n, is used.
Figure 5:
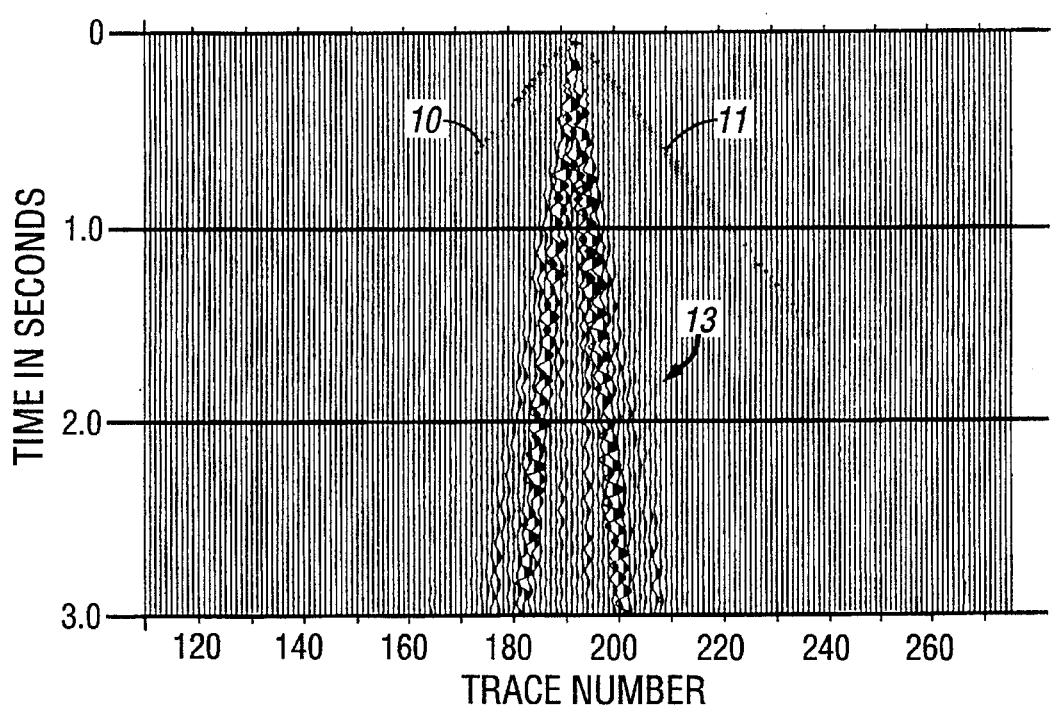
FIG. 5 is the example of FIG. 1 processed using the alternative embodiment of this invention.

The best mode of operation may be illustrated with the aid of FIGS. 3–5.

FIG. 3 shows the results of processing the seismic data in accordance with the formulations (4) and (5), with the damping factor, n, set to unity. Some residual interference, 10 and 11 still remains.

FIG. 4 illustrates the data of FIG. 3 except that a very large value was selected for the damping factor n. Virtually all of the interference has been removed.

In FIG. 5, the data of FIG. 1 have been processed according formulation (4) and alternative formulation (6), selecting a value of unity for the damping factor. As may be seen, much of the interfering signal content at 10 and 11 has been removed.

The processed, scaled seismic signal traces, formatted as shown in FIGS. 3–5, provide a substantially noise-free display of a portion of the subsurface of the earth. That process leads to the enhancement of the recovery of valuable natural resources for the benefit of humankind.

This invention has been described with a certain degree of specificity but it is limited only by the appended claims. Others skilled in the art will consider variations of this methods taught herein but which will fall within the scope of the claims.

What is claimed is:

1. A method for abating spectral noise contamination from a block of seismic data signals acquired and recorded as a set of time-scaled seismic data traces, comprising:

partitioning said block of seismic data into selected time windows;

resolving the spectrum of said seismic data block by octaves for each said time window;

calculating a desired raw statistic from the difference between the measured spectrum and a preselected model spectrum for each time window and each octave;

decomposing said statistic within each said time window for each octave into organizational components to calculate a noise statistic;

recombining said organizational components into a noise-free statistic after removing of said noise statistic therefrom;

for each trace comprising said block of data signals, comparing the raw statistic for each time window and each octave with said recombined statistic;

scaling the amplitude of the seismic data signals on each said trace by a coefficient equal to the ratio between the recombined statistic and the raw statistic when said raw statistic exceeds said recombined statistic; and displaying said scaled seismic data signals formatted as a block of substantially contamination-free time-scale traces representative of a cross section of a portion of the earth.

2. The method as defined by claim 1, wherein said raw statistic is computed from:

$$\chi^2 = \frac{\Sigma(X_q - M_p)^2}{\Sigma M_p}$$

where $X^2$= raw frequency statistic, $M_p$= model frequency statistic.

3. The method as defined by claim 2 wherein the scaling coefficient is given by:

$$K = \begin{vmatrix} (\chi_q^2/\chi_p^2)^n, \chi_q^2 > \chi_p^2 \\ 1.0, \chi_q^2 \leq \chi_p^2 \end{vmatrix}$$

where

K= scaling constant, $X_q^2$= raw statistic, $X_p^2$= recombined statistic, n= damping factor, an integer equal to or greater than unity.

4. A spectral-noise abatement method for use in processing signals recorded on a block of seismic data traces, comprising:

partitioning said seismic data traces into time windows of arbitrary dimensions and resolving their spectral content into octaves;

providing a model spectral response for each said time window and each said octave;

generating a raw statistic from the difference between said model spectral response and measured spectral responses within each said time window and each said octave;

decomposing said raw statistic into organizational components, iteratively solving for a spectral noise component and recombining said organizational components into a noise-free statistic after removing said noise component therefrom;

for each trace comparing said raw statistic with said noise-free statistic;

applying a scaling coefficient to the signals on those traces for which said raw statistic exceeds said noise-free statistic; and formatting the processed seismic traces in a manner to provide a visible display of a portion of the subsurface of the earth.

5. A method for minimizing the spectral noise from seismic signals recorded on a section of seismic trace data, comprising:

partitioning said seismic section into time windows and spectral components;

providing a model power spectrum;

for each said time window, measuring the power spectrum of said seismic data;

determining a raw statistic from the difference between the model spectrum and the measured spectrum;

decomposing said raw statistic into organizational components and solving for a spectral noise component;

recombining said organizational components after removal of said noise component;

determining the difference between the recombined statistic and the raw statistic for each said time window of each said trace;

scaling the seismic signals on each said trace in proportion to the difference when said raw statistic exceeds said recombined statistic; and displaying the scaled, substantially noise-free seismic signal traces to provide a representation of the subsurface of the earth.

6. The method as defined by claim 2 wherein is scaling coefficient is given by $$K = \begin{vmatrix} (X_p/X_q)^n, X_q > X_p \\ 1.0\ X_q \leq X_p \end{vmatrix}$$

where
- $K$ = scaling coefficient,
- $X_q$ = raw statistic,
- $X_p$ = recombined statistic,
- $n$ = damping factor, an integer equal to or greater than unity.

* * * * *